Dec. 19, 1961     K. E. FAIVER ET AL     3,013,812
AIR FLOW CONTROL APPARATUS
Filed July 11, 1956     4 Sheets-Sheet 1

INVENTORS
Kenneth E. Faiver &
BY Ralph W. Perkins
ATTORNEY

Dec. 19, 1961    K. E. FAIVER ET AL    3,013,812
AIR FLOW CONTROL APPARATUS
Filed July 11, 1956    4 Sheets-Sheet 2

INVENTORS
Kenneth E. Faiver &
Ralph W. Perkins
BY
S. C. Thorpe
ATTORNEY

Dec. 19, 1961 K. E. FAIVER ET AL 3,013,812
AIR FLOW CONTROL APPARATUS

Filed July 11, 1956 4 Sheets-Sheet 3

INVENTORS
Kenneth E. Faiver &
BY Ralph W. Perkins

J. C. Thorpe
ATTORNEY

Dec. 19, 1961  K. E. FAIVER ET AL  3,013,812
AIR FLOW CONTROL APPARATUS
Filed July 11, 1956  4 Sheets-Sheet 4

INVENTORS
Kenneth E. Faiver &
BY Ralph W. Perkins
J. C. Thorpe
ATTORNEY

United States Patent Office
3,013,812
Patented Dec. 19, 1961

3,013,812
AIR FLOW CONTROL APPARATUS
Kenneth E. Faiver and Ralph W. Perkins, Lansing, Mich., assignors to General Motors Corporation, Detroit, Mich., a corporation of Delaware
Filed July 11, 1956, Ser. No. 597,189
10 Claims. (Cl. 280—124)

This invention concerns control apparatus for a vehicle suspension system utilizing pneumatic springs in lieu of the conventionally employed metal springs.

Pneumatic springs afford a number of substantial advantages apart from the improved ride they provide. Thus, spring replacement is largely eliminated since there is no metal fatigue; and because of the absence of metal to metal contact lubrication is unnecessary. Incident to the improved riding qualities, body stresses are markedly reduced, road shocks being more completely absorbed with the transmission of fewer vibrations to the body.

Other advantages inherent in air suspension have relation to the ease and rapidity with which the spring height and rate may be changed. With such a suspension, it is possible by charging or discharging air from the springs upon a change in load to maintain the body at a constant level with respect to the axles irrespective of load. This levelling of the vehicle body may be accomplished automatically using presently available equipment and in this connection reference is made to Rossman Patent 2,670,201 of February 23, 1954.

The device shown in the identified patent comprises a beam member disposed within a housing made fast to the vehicle body and linked to the axle through a suitable lever. On relative movement of the body and axle, the beam is actuated to displace one of two valves controlling the flow of air to and the exhaust of air from the corresponding spring. The device further comprises as an essential part a hydraulic dashpot which renders it incapable of operation from ordinary road shocks. Accordingly, the device except for leakage and pressure changes due to temperature changes, normally functions only when the vehicle is stationary, i.e. during loading and unloading of the vehicle.

Air suspension also affords the possibility of easy control of body roll as the vehicle negotiates a turn or curve. Thus, as the body begins to roll, air may be admitted to the outside springs to stiffen them and at the same time may be exhausted from the inside springs to reduce their rate or stiffness. In this way, the vehicle body may be stabilized and the curve more safely and comfortably negotiated.

Experience with the levelling and roll control devices heretofore proposed has not been altogether satisfactory. For one thing, it has been determined that the more or less sudden charging and discharging of air from the springs during levelling tends to induce hunting and overshooting of the fill and discharge valves, a condition causing the body to oscillate about the true height position. Also, it has been found that when roll control is attempted by charging and discharging air through the levelling devices, the time lag built into the same so delays the desired changes in the spring rates that the effect of the rate changes is too late to have significance; in fact untoward complications are introduced.

The present invention has as a principal object to provide means whereby the time lag is overruled during a turn so that the change in the spring rates may be effected substantially instantaneously.

Another object is to provide apparatus, effective when the vehicle is stationary, for charging or discharging air from the springs (as dictated by the nature of the load change) in increments or "shots" thereby to prevent the undesired hunting and overshooting previously experienced.

Still another object is to provide means, effective during a turn, for by-passing the apparatus last-mentioned to the end that the roll combating changes occur without delay.

An additional object is to provide pendulum means of novel characteristics desirable in roll control and similar devices.

Still other objects and features of the invention will become apparent from the following detailed description referring to preferred embodiments thereof. The description will proceed with reference to the accompanying drawings in which:

FIGURE 2A is a continuation of FIGURE 2;

Figure 4:
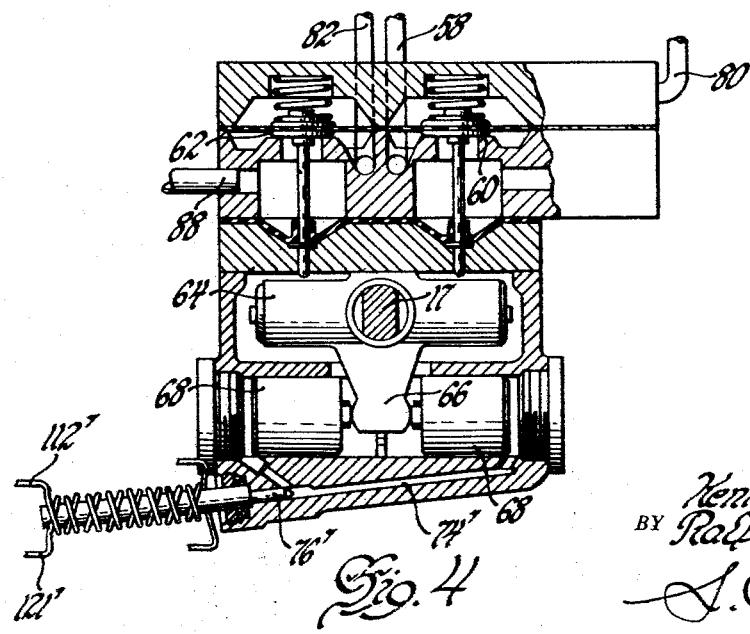
Figure 5:
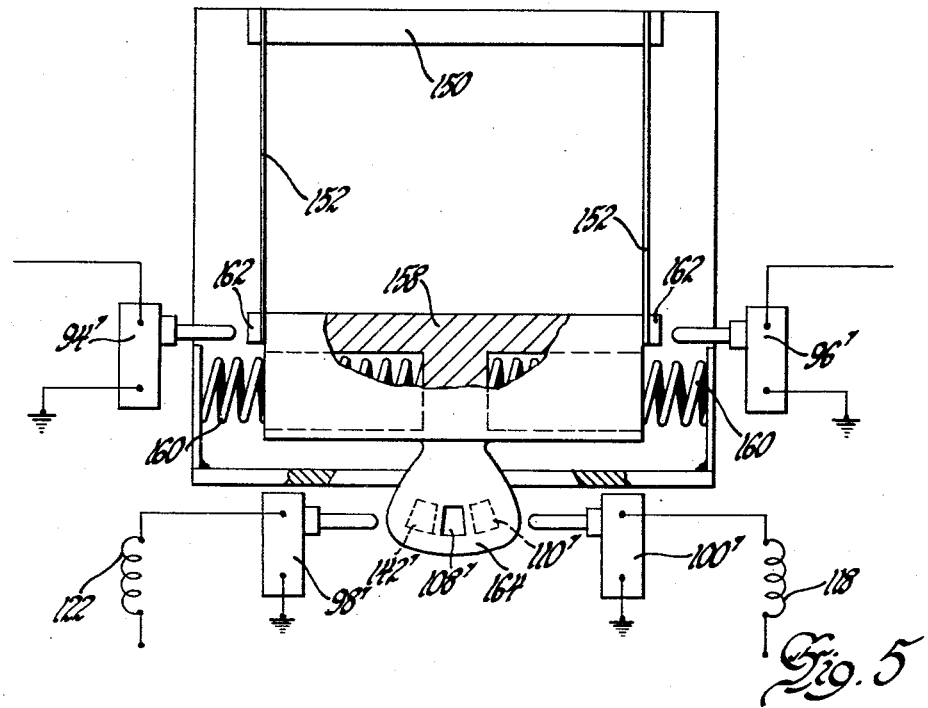

FIGURE 4 diagrammatically illustrates a modification;

FIGURE 5 shows a modified form of pendulum control; and

Figure 6:
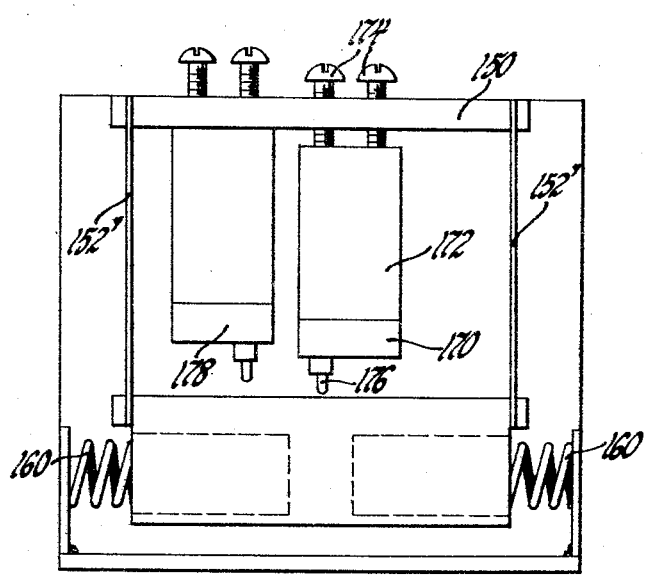

FIGURE 6 shows the pendulum control of FIGURE 5 applied in a somewhat different manner.

Figure 1:
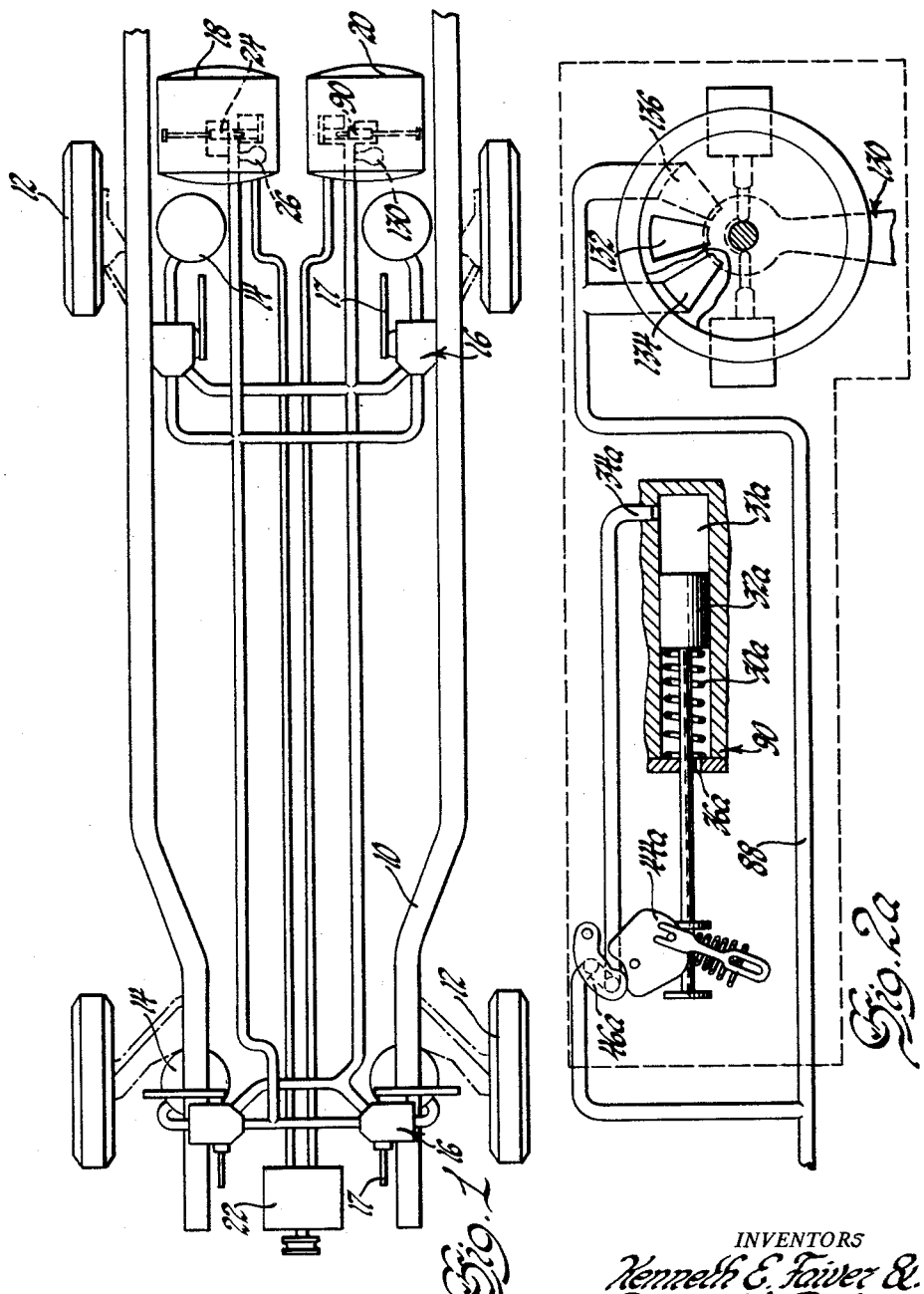
FIGURE 1 is a plan view of a vehicle equipped with a pneumatic suspension.

Referring first to FIGURE 1, the numeral 10 denotes the side rail components of a vehicle frame below which the axles mounting the road wheels 12 are disposed. The pneumatic springs 14 between the frame and axles may be of any suitable type, but diaphragm springs as shown, for example, in copending application Serial No. 575,120, filed March 30, 1956, now Patent No. 2,939,698, dated June 7, 1960, in the name of Von D. Polhemus are preferred. Each of the springs is under the control of a corresponding levelling device 16 which comprises an actuating arm 17 and which may otherwise generally correspond to the device disclosed and claimed in the previously mentioned Rossman Patent 2,670,201. The levelling devices communicate via the conduits shown with a high pressure tank 18 and a low pressure tank 20. A compressor 22 powered as by belt and pulley from the crankshaft of the vehicle engine operates to maintain the tank 18 at a predetermined pressure. The compressor draws from the low pressure tank 20 to which all of the springs 14 exhaust.

Figure 3:
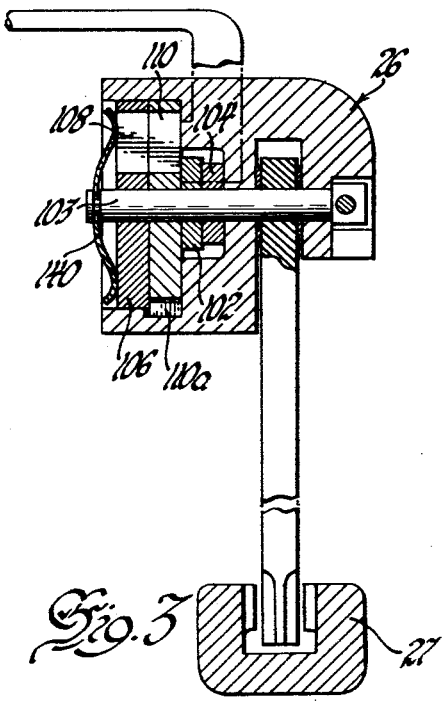
FIGURE 3 is a detail of a part comprised in the system of FIGURE 2.

Within the tank 18 is mounted a device 24 hereinafter referred to as an "interrupter" and a pendulum 26 having a magnetic damper 27 (FIG. 3) associated therewith.

Interrupter 24 includes a housing 28 confining a spring 30 loading a plunger 32. The housing 28 is ported to provide communication with a conduit 34 and has an orifice 36 at one end.

Plunger 32 comprises a guide portion 38 and a stem 40 terminating in a flange 42. Such flange is functional with relation to a cam 44 controlling a valve element 46. An over-center mechanism including a pivoted fork 49 loaded by a spring 50 assures quick rotation of the cam in either direction when the cam is carried to a position whereat the fork 49 is inclined to the vertical. Pivot 52 is accommodated in a slot formed in the fork 49, the necessary lost motion between the two parts being thus provided.

A conduit 54 which connects via a channel in the valve element 46 with the conduit 34 extends to a passageway 58 leading to the levelling device 16. Such device serves an air spring 14 and includes a pair of valves 60 and 62 controlled by a beam 64. The latter accommodates the actuating arm 17 and has a depending portion 66 abutted by plungers 68. It should be clear that rotation of the arm 17 induces rocking of the beam 64 with actuation of one of the valves 60 or 62 depending on the direction of the rotation.

Spaces 70, 72 outward of the pistons 68, also the passageway 74, are filled with hydraulic fluid; consequently, incident to the rocking movement of the beam 64, fluid is displaced from the space 70 to the space 72 or vice versa, the displaced fluid flowing through passageway 74. The latter has therein a restrictor 76 tending to retard movement of the fluid. In this way, a dashpot effect is afforded, giving a time delay serving to prevent operation of the levelling device from wheel displacements occurring with the vehicle in motion.

With the vehicle stationary, should the load increase the beam 64 is rocked counterclockwise to open the valve 60 resulting in the admission of air to the spring 14 via the passageways 80 and 82, of which the former will be seen as having a check valve 84 therein serving to prevent back flow. The air flow from the tank 18 to the spring 14 via the levelling device proceeds with intermittent interruption of the flow—a function of the device 24. Thus, when the levelling device calls for the charging of air to the spring 14, the first increment of air derives from the chamber 31, this chamber having been pressurized incident to the completion of the preceding cycle. Once the air becomes exhausted in such chamber, the pressure of the air entering via the orifice 36 shifts the piston 32 against the resistance of the spring 30. As the guide portion 38 of the piston nears the left end of the cylinder 28, flange 42 engages cam 44, or more accurately an abutment carried thereby, to swing the cam clockwise, such action being marked by rotation of the valve 46 and opening of the passageway 34 to the tank 18. Chamber 31 accordingly becomes immediately recharged with air, returning the piston 32 to its initial position shown with the aid of the spring 30. Incident to this action, flange 42 engages a second abutment on the cam 44, rotating the cam to a position enabling the over-center mechanism to restore the cam to its shown position. The described cycle is repeated for so long as the valve 60 remains open.

Now when the levelling valve calls for the discharge of air from the spring 14, valve 62 is opened by the action of the arm 17 (FIG. 1) and air exhausts through the passage 88 to the interrupter 90 (FIG. 2A) confined within the low pressure tank 20. The interrupter 90 conforms with the interrupter 24 except for the reversal of the ports and the disposition of the springs 30a which is applied in aid of the air within the low pressure tank, such air having access to the interrupter via the passage 36a. In operation, the pressure of the exhaust air from the spring on entering the chamber 31a via the passage 34a forces the piston 32a leftward against the resistance of the spring 30a until the cam 44a swings the valve element 46a to an extent such that line 34a becomes open to the tank. On the consequent loss of pressure at 31a, piston 32a is shifted rightward by the spring 30a and the tank pressure to close the valve element 46a whereafter the cycle is repeated as often as necessary to discharge from the air spring the quantity of air set by the position of the levelling device.

Figure 2:
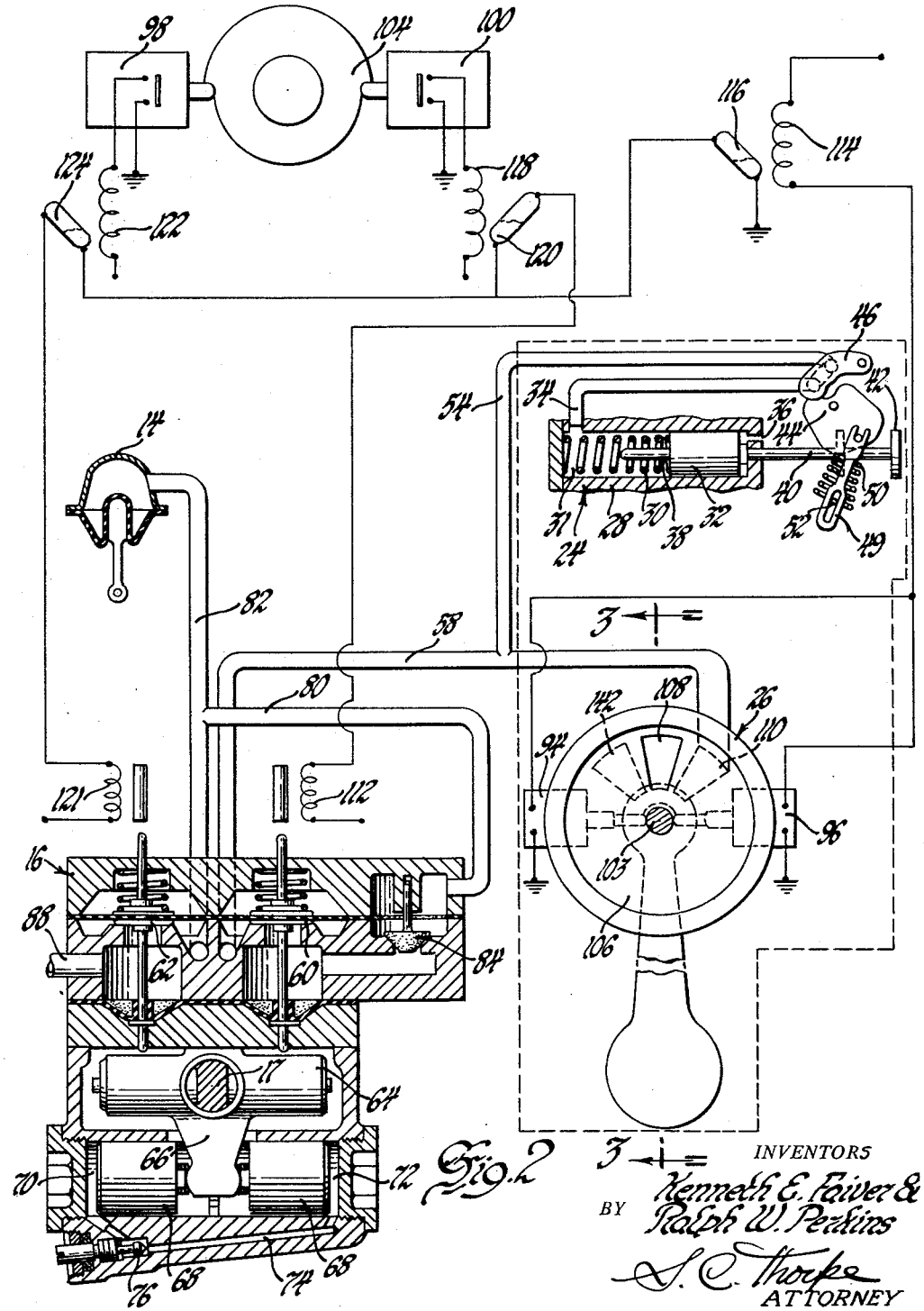
FIGURE 2 is a generally diagrammatic representation of control apparatus conforming to the invention.

It should be understood that the foregoing description refers to the levelling occuring with a change in load under static conditions, i.e. with the vehicle stationary. To return to pendulum 26 which controls the air flow under dynamic conditions, there will be seen in association therewith four switches 94, 96, 98, and 100; switches 94 and 96 being actuable by a cam 102 (FIG. 3), switches 96 and 100 by a second cam 104. In FIGURE 2 cam 104 and the associated switches are shown remote from the pendulum as a matter of simplicity of presentation. Both cams 102 and 104 are fast on the shaft 103 of the pendulum. Also fast on such shaft is a valve 106 having a port 108 therein opening to the high pressure tank. On clockwise swinging of the pendulum, occurring during a right turn when the vehicle body tends to roll counter-clockwise (spring 14 should be considered as on the right side of the vehicle), port 108 gains registry with a passage 110 in a fixed plate 110a so that air under the pressure prevailing in the tank 18 is directly introduced into the passage 58, the interrupter 24 being bypassed.

The clockwise movement of the pendulum 26 not only brings about registry of the ports 108 and 110 as described, but also results in the simultaneous closing of switches 96 and 100. As a consequence, the coil 112 associated with the valve 60 is energized through coil 114, mercury switch 116, coil 118, and mercury switch 120. The energization of coil 112 opens valve 60 and pressure air is accordingly supplied to the spring 14 substantially instantaneously to counteract the roll.

Coil 112 and the associated switches and circuitry providing the quick opening of the valve 60 when energized; in effect overrule the dashpot mechanism including the pistons 68 and the restricted passageway 74, which would otherwise preclude the desired quick charging of the air spring.

Assuming a left turn, spring 14 in this case being an inside spring, the counterclockwise rotation of the pendulum 26 closes switches 94 and 98 energizing coil 121 through coil 114, mercury switch 116, coil 122, and mercury switch 124. Accordingly, valve 62 is opened so that the spring quickly exhausts to the low pressure tank via the passage 88. The exhaust air does not enter the tank via the interrupter 90 but through a bypass pendulum valve 130. This valve comprises a central port 132 opening to the low pressure tank and adapted to register with one of the ports 134, 136 depending upon the direction the pendulum is swung. Both of ports 134 and 136 communicate with the passage 88.

It should be clear that coil 121 with the associated switches and circuitry constitute means for overruling the previously described dashpot so as to achieve the desired substantially instantaneous exhaustion of air from the spring 14.

Whether the turn has involved the charging or discharging of air from the spring, once completed the spring is restored to its initial or curb pressure by the action of the leveling valve which, while not actuable by road shocks due to the time delay, is sensitive at all times to any maintained deviation of the arm 17 from its normal position as determined by the setting of the valve.

Reverting still again to pendulum 26 (FIG. 3), there will be seen a spring 140 which operates to load the member or portion comprising the port 108 against the plate having port 110 therein. This plate further comprises a port 142 (FIG. 2) communicating with the levelling device, not shown, controlling the air springs at the opposite side of the vehicle. It is not considered necessary to show or describe herein the electrical and pneumatic parts and circuitry employed in conjunction with the opposed springs since the same accord with FIGURE 2.

FIGURE 4 shows another way of overruling the dashpot to obtain the quick change in spring rate essential for roll control. In this instance, the restrictor 76' is designed as an armature controlled by each of the coils 112' and 121' (see FIG. 2). Upon energization of either of these coils the armature is withdrawn to fully open the passageway 74', the dashpot action consequently being lost.

In FIGURE 5 illustrating a modified form of pendulum control which has been found to give excellent results, the numeral 150 denotes a frame member affording support to a pair of suspension elements 152 desirably fabricated from thin shim stock. These elements are of the same size, are flexible, and have sufficient width to assure stability in the direction normal to their swing.

Suspended at the lower ends of the elements 152 is a pendulum weight 158 formed to accommodate return springs 160 and having contact buttons 162. A valving plate 164 depending from the weight 158 and swingable in a slot in the frame 150 has a port 108' therein functionally equivalent to the port 108 of the previously described pendulum control 26 (FIG. 2).

The manner in which the pendulum of FIGURE 5 is substituted for the pendulum control 26 is believed obvious. However, for convenience the numbering of the several switches and ports follows the numbering of the corresponding parts in FIGURE 2 except that the numerals are primed.

The pendulum of FIGURE 5 is considered as having a utility going beyond the particular application illustrated. Another mode of applying the pendulum is shown by FIGURE 6. In this instance, a micro-switch 170 is suspended from the frame 150 by means of a member 172 made adjustable by screws 174. Such construction is advantageous in that it takes advantage of the vertical as well as the horizontal component of movement of the pendulum weight 158 on the occurrence of an inertia disturbance. This vertical component of movement obtains by reason of the fact that the lower ends of the elements 152' describe approximate circle arcs. Since the microswitch pickup pin 176 is disposed a short distance above the zero position of the pendulum weight the switch can clearly be operated as an incidence to the vertical movement of the weight. Equally obviously, additional switches as micro-switch 178 can be mounted in the path of the weight and arranged and adjusted for sequence operation. Thus, with the construction as illustrated it becomes feasible to operate a series of switches representing different degrees of inertia.

The construction of FIGURE 6 where dependency is placed on the vertical component of movement of the plunger provides the maximum amount of stability against hunting of the on and off switch positions. This is accomplished by so designing the suspension elements 152 that the vertical movement of the weight is little compared to the horizontal component of movement thereof. Significantly, after operation of the switch the pendulum weight is free to continue its swing with minimum retardation as a consequence of contact with the switch pin. This follows because compression of the over-travel switch spring is small, actually only a few thousandths of an inch, compared to the extent of horizontal travel of the weight. As a consequence, no abrupt speed change or any considerable amount of frictional impedance is encountered to arrest the weight or to bounce it in the reverse direction—conditions which would tend to cause hunting. The pendulum weight thus continues its swing as a function of the inertia obtaining, with a minimum of disturbance from operating the switch. The described characteristics, preventing or minimizing hunting, are manifestly of great importance in attaining stability of circuit operation.

Apart from the foregoing, mention should be made of the fact that the pendulum weight can swing freely beyond the positions of operation of the two micro-switches. In view of this no additional damping is required to prevent hunting. The slight amount of friction inherent in the contact with the switch pickup pins is sufficient to damp out objectionable resonance peaks.

The invention having been thus described and illustrated what is claimed is:

1. Control apparatus for an automotive pneumatic suspension system comprising: a source of air pressure, an interrupter for discharging air from said source in increments, means for the accommodation of exhaust air, a second interrupter for introducing exhaust air into said last means in increments, an air spring communicable with said source and said means through said interrupters, a levelling device in the air circuits between said spring and said interrupters operable to control the air flow between the spring and said interrupters, said device having a mechanism associated therewith serving to introduce a time delay rendering the device normally ineffectual to admit or exhaust air from said spring for a predetermined period of time after operation thereof to an air admitting or exhausting position, and means sensitive to inertia forces for overruling said mechanism under predetermined dynamic conditions whereby, with the vehicle in motion, the rate of said spring is changed by a change in the pressure of the air therein.

2. Control apparatus for an automotive pneumatic suspension system comprising: a source of air pressure, an interrupter for discharging air from said source in increments, means for the accommodation of exhaust air, an air spring communicable with said means and with said source through said interrupter, a levelling device in the air circuits between said spring and said means and between said source and said interrupter, said device being operable to control the air flow to and from the spring and having a mechanism associated therewith serving to introduce a time delay rendering the device normally ineffectual to admit or exhaust air from the spring for a predetermined period of time after operation thereof to an air admitting or exhausting position, and means sensitive to inertia forces for overruling said mechanism under predetermined dynamic conditions whereby, with the vehicle in motion, the rate of said spring is changed by a change in the pressure of the air therein.

3. Control apparatus for an automotive pneumatic suspension system comprising: a source of air pressure, means for the accommodation of exhaust air, an interrupter for introducing exhaust air into said last means in increments, an air spring communicable with said source and with said means through said interrupter, a levelling device in the air circuits between said spring and said source and between said spring and said interrupter, said device being operable to control the air flow to and from the spring and having a mechanism associated therewith serving to introduce a time delay rendering the device normally ineffectual to admit or exhaust air from the spring for a predetermined period of time after operation thereof to an air admitting or exhausting position, and means sensitive to inertia forces for overruling said mechanism under predetermined dynamic conditions whereby, with the vehicle in motion, the rate of said spring is changed by a change in the pressure of the air therein.

4. Control apparatus for an automotive pneumatic suspension system comprising: a source of air pressure, an interrupter for discharging air from said source in increments, an inertia sensitive valve device for bypassing said interrupter so that air may be discharged from said source as a continuous stream, means for the accommodation of exhaust air, a second interrupter for introducing exhaust air into said means in increments, a second inertia sensitive valve device for by-passing said second interrupter so that air may be introduced into said means as a continuous stream, an air spring communicable with said source and said means through said interrupters and through said inertia sensitive valve devices, a levelling device in the air circuits between said spring and said interrupters and inertia sensitive valve devices, said levelling device being operable to control the air flow to and from said spring and having a mechanism associated therewith serving to introduce a time delay rendering it normally ineffectual to admit or exhaust air from said spring for a predetermined period of time after operation thereof to an air admitting or exhausting position, and means associated with said first-mentioned inertia sensitive valve device for overruling said mechanism under predetermined dynamic conditions whereby, with the vehicle in motion, the rate of said spring is substantially instantaneously changed by a change in the pressure of the air therein.

5. Control apparatus for an automotive pneumatic suspension system comprising: a source of air pressure, an interrupter for discharging air from said source in increments, an inertia sensitive valve device for bypassing said interrupter so that air may be discharged from said source as a continuous stream, means for the accommodation of exhaust air, an air spring communicable with said means and with said source through said interrupter and said inertia sensitive valve device, a levelling device in the air circuits between said spring and said means and between said spring and said interrupter and inertia sensitive valve device, said levelling device being operable to control the air flow to and from said spring and having a mechanism associated therewith serving to introduce a time delay rendering the device normally ineffectual to admit or exhaust air from said spring for a predetermined period of time after operation thereof to an air admitting or exhausting position, and means associated with said inertia sensitive valve device for overruling said mechanism under predetermined dynamic conditions whereby, with the vehicle in motion, the rate of said spring is substantially instantaneously changed by a change in the pressure of the air therein.

6. Control apparatus for an automotive pneumatic suspension system comprising: a source of air pressure, means for the accommodation of exhaust air, an interrupter for introducing exhaust air into said means in increments, an inertia sensitive valve device for bypassing said interrupter so that air may be introduced into said means as a continuous stream, an air spring communicable with said source and with said interrupter and inertia sensitive valve device, a levelling device in the air circuits between said spring and said source and between said spring and said interrupter and inertia sensitive valve device, said levelling device being operable to control the air flow to and from said air spring and having a mechanism associated therewith serving to introduce a time delay rendering it normally ineffectual to admit or exhaust air from said spring for a predetermined period of time after operation thereof to an air admitting or exhausting position, and means for overruling said mechanism under predetermined dynamic conditions whereby, with the vehicle in motion, the rate of said spring is substantially instantaneously changed by a change in the pressure of the air therein.

7. Control apparatus for an automotive pneumatic suspension system comprising: a high pressure air tank, an interrupter for discharging air from said tank in increments, a pendulum valve device in the operation of which said interrupter is bypassed so that air may be discharged from said tank as a continuous stream, a second tank for the accommodation of exhaust air, a second interrupter for introducing exhaust air to said second tank in increments, a second pendulum valve device in the operation of which said second interrupter is bypassed so that air may be introduced into said second tank as a continuous stream, an air spring communicable with said interrupters and pendulum valve devices, a levelling device in the air circuits operable to control the air flow to and from said spring and having a dashpot mechanism associated therewith serving to introduce a time delay rendering it normally ineffectual to admit or exhaust air from said spring for a predetermined period of time after operation thereof to an air admitting or exhausting position, and electrical means associated with said first-mentioned pendulum valve device for overruling said mechanism under predetermined dynamic conditions whereby, with the vehicle in motion, the rate of said spring is substantially instantaneously changed by a change in the pressure of the air therein.

8. Control apparatus according to claim 7 wherein said dashpot mechanism comprises a passageway having a restrictor therein in the form of an armature retracted on the energization of a circuit including a switch controlled by said first-mentioned pendulum valve device.

9. In apparatus of the class described, means for charging air to a pneumatic spring in increments, said means comprising a cylinder having a spring-loaded piston therein, said cylinder being disposed within a pressure vessel and having a high pressure port open to said vessel and a low pressure port openable to said spring through a valve device, and means including a cam actuated by said piston to open and close said valve device, said cam having an over-center mechanism associated therewith.

10. In apparatus of the class described, means for charging an air tank with exhaust air from a pneumatic spring in increments, said means comprising a cylinder having a spring-loaded piston therein, said cylinder having a low pressure port open to said tank and a high pressure port openable to said spring through a valve device, and means including a cam actuated by said piston to open and close said valve device, said cam having an over-center mechanism associated therewith.

References Cited in the file of this patent

UNITED STATES PATENTS

| | | |
|---|---|---|
| 1,055,153 | Ferguson | Mar. 4, 1913 |
| 1,175,062 | Johnson | Mar. 14, 1916 |
| 1,990,517 | Bedford et al. | Feb. 12, 1935 |
| 2,021,777 | Hatot | Nov. 19, 1935 |
| 2,048,866 | Hunt | July 28, 1936 |
| 2,115,072 | Hunt et al. | Apr. 26, 1938 |
| 2,257,773 | Wolf | Oct. 7, 1941 |
| 2,361,575 | Thompson | Oct. 31, 1944 |
| 2,563,068 | Rappl et al. | Aug. 7, 1951 |
| 2,593,040 | Lloyd | Apr. 15, 1952 |
| 2,762,633 | Gouirand | Sept. 11, 1956 |
| 2,778,656 | May | Jan. 22, 1957 |

FOREIGN PATENTS

| | | |
|---|---|---|
| 1,110,226 | France | Oct. 5, 1955 |